US009404029B2

(12) United States Patent
Harris et al.

(10) Patent No.: US 9,404,029 B2
(45) Date of Patent: Aug. 2, 2016

(54) RHEOLOGY MODIFIERS

(71) Applicant: Chevron Phillips Chemical Company LP, The Woodlands, TX (US)

(72) Inventors: Jeffery R. Harris, Tulsa, OK (US); Jim D. Byers, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 56 days.

(21) Appl. No.: 14/621,591

(22) Filed: Feb. 13, 2015

(65) Prior Publication Data

US 2015/0159075 A1 Jun. 11, 2015

Related U.S. Application Data

(62) Division of application No. 13/459,677, filed on Apr. 30, 2012, now abandoned.

(51) Int. Cl.
*C09K 8/36* (2006.01)
*C09K 8/34* (2006.01)

(52) U.S. Cl.
CPC .... *C09K 8/36* (2013.01); *C09K 8/34* (2013.01)

(58) Field of Classification Search
None
See application file for complete search history.

(56) References Cited

U.S. PATENT DOCUMENTS

| 3,514,399 | A |  | 5/1970 | Robinson |
|---|---|---|---|---|
| 4,131,716 | A | * | 12/1978 | Bertozzi ............... C07C 323/00 427/508 |
| 4,304,841 | A | * | 12/1981 | Horn ....................... G03F 7/027 430/281.1 |
| 5,260,268 | A |  | 11/1993 | Forsberg et al. |
| 5,536,871 | A |  | 7/1996 | Santhanam |
| 5,610,110 | A |  | 3/1997 | Azema et al. |
| 5,909,779 | A |  | 6/1999 | Patel et al. |
| 6,214,469 | B1 |  | 4/2001 | Sukhadia et al. |
| 6,291,406 | B1 |  | 9/2001 | Rose et al. |
| 6,355,359 | B1 |  | 3/2002 | Sukhadia et al. |
| 6,462,096 | B1 |  | 10/2002 | Dino et al. |
| 6,589,917 | B2 |  | 7/2003 | Patel et al. |
| 7,087,708 | B2 | * | 8/2006 | Rappoport ......... C08G 18/0823 528/373 |
| 7,585,932 | B2 |  | 9/2009 | Byers et al. |
| 7,781,484 | B2 |  | 8/2010 | Byers et al. |
| 7,910,666 | B2 |  | 3/2011 | Byers et al. |

(Continued)

FOREIGN PATENT DOCUMENTS

| EP | 0403437 A2 | 12/1990 |
| WO | 2004094522 A2 | 11/2004 |
| WO | 2013165728 A1 | 11/2013 |

OTHER PUBLICATIONS

Foreign communication from a related counterpart application—International Preliminary Report on Patentability, PCT/US2013/037598, Nov. 4, 2014, 9 pages.
Foreign communication from a related counterpart application—International Search Report and Written Opinion, PCT/US2013/037598, May 7, 2013, 12 pages.
Office Action dated Aug. 12, 2014 (17 pages), U.S. Appl. No. 13/459,677, filed Apr. 30, 2012.
Office Action (Final) dated Dec. 4, 2014 (14 pages), U.S. Appl. No. 13/459,677, filed Apr. 30, 2012.
ANSI/API Specification 13A entitled "Specification for Drilling Fluids Materials," Eighteenth Edition, Feb. 2010, 1 page.

*Primary Examiner* — Alicia Bland
(74) *Attorney, Agent, or Firm* — Conley Rose, P.C.; Rodney B. Carroll; Monte R. Rhodes

(57) ABSTRACT

A non-aqueous wellbore servicing fluid comprising a rheology modifier wherein the rheology modifier comprises a reaction product of a polysulfide, a dimer acid and a polyfunctional amine. A method of conducting an oilfield operation comprising placing an oil-based mud comprising a rheology modifier into a wellbore wherein the rheology modifier comprises a reaction product of a polysulfide, a dimer acid and a polyfunctional amine.

21 Claims, 4 Drawing Sheets

(56) References Cited

U.S. PATENT DOCUMENTS

| | | |
|---|---|---|
| 7,989,655 B2 | 8/2011 | Refvik et al. |
| 8,003,748 B2 | 8/2011 | Byers et al. |
| 2007/0015902 A1 | 1/2007 | Rappoport et al. |
| 2008/0214774 A1 | 9/2008 | Brown et al. |
| 2009/0124762 A1 | 5/2009 | Brown et al. |
| 2009/0124784 A1 | 5/2009 | Brown et al. |
| 2009/0227478 A1 | 9/2009 | Dino |
| 2013/0288933 A1 | 10/2013 | Harris et al. |

\* cited by examiner

RHEOLOGY MODIFIERS

CROSS REFERENCE TO RELATED APPLICATIONS

This application is a divisional of and claims priority to U.S. patent application Ser. No. 13/459,677 filed Apr. 30, 2012, published as US 2013/0288933 A1 and entitled "Rheology Modifiers," which is incorporated by reference herein in its entirety.

TECHNICAL FIELD OF THE INVENTION

This disclosure relates to wellbore servicing fluids. More specifically, this disclosure relates to rheology modifiers for use in drilling muds.

BACKGROUND

Subterranean deposits of natural resources such as gas, water, and crude oil are commonly recovered by drilling wellbores to tap subterranean formations or zones containing such deposits. Various fluids are employed in drilling a wellbore and preparing the wellbore and an adjacent subterranean formation for the recovery of material therefrom. For example, a drilling fluid or mud is usually circulated through a wellbore as it is being drilled to cool the bit, keep deposits confined to their respective formations during the drilling process, and bring drill cuttings to the surface.

Increased drilling activity has continued at greater depths in challenging geographic areas such as marine environments. Drilling fluids used during these recovery operations are often exposed to a range of temperatures as the drilling fluid moves from a platform structure to the beginning/bottom of the ocean floor. For example, a drilling fluid moving through a drill string or pipe from a platform structure to 30,000-40,000 feet of combined water depth and core substrata may experience temperatures ranging from 35° F. to 400° F. Drilling fluids are designed to display a set of rheological characteristics that are suitable for a particular recovery operation. One challenge to the use of drilling fluids in challenging geographic areas is the maintenance of desirable rheological characteristics over the range of environmental conditions to which the fluids are exposed. Thus an ongoing need exists for improved drilling fluids for use in challenging geographic areas.

SUMMARY

Disclosed herein is a non-aqueous wellbore servicing fluid comprising a rheology modifier wherein the rheology modifier comprises a reaction product of a polysulfide, a dimer acid and a polyfunctional amine.

Also disclosed herein is a method of conducting an oilfield operation comprising placing an oil-based mud comprising a rheology modifier into a wellbore wherein the rheology modifier comprises a reaction product of a polysulfide, a dimer acid and a polyfunctional amine.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Figure 1:
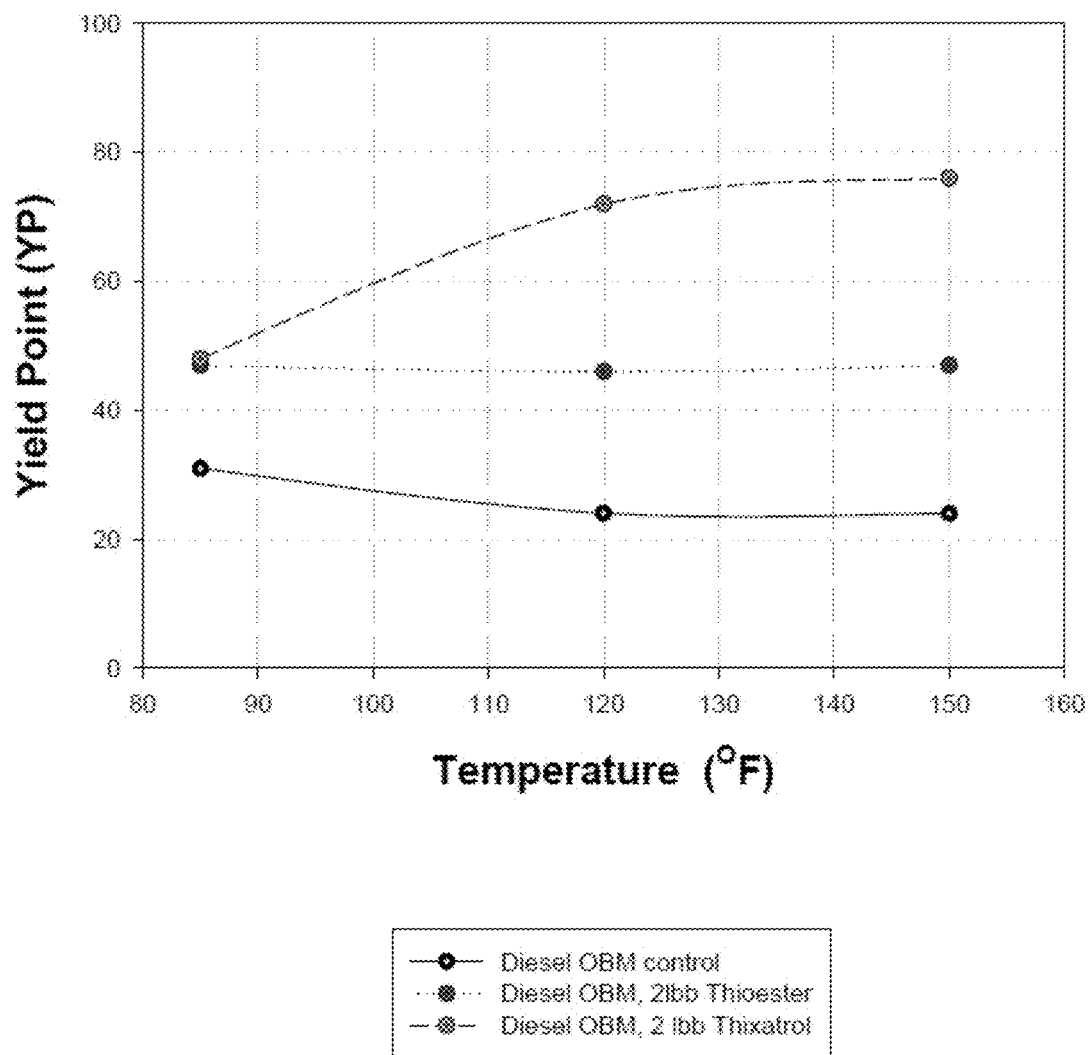
FIGS. 1 and 2 are plots of yield point as a function of temperature for the samples from Example 1.

Disclosed herein are methods and compositions for use in wellbore servicing operations. In an embodiment, the composition comprises a wellbore servicing fluid (WSF) and a rheology modifier. Such compositions may maintain one or more user and/or process desired rheological characteristics over a range of conditions encountered during a wellbore servicing operation. WSFs comprising a rheology modifier of the type disclosed herein are termed flat rheology compositions for wellbore servicing (FRC).

In an embodiment, the FRC comprises a rheology modifier. The rheology modifier may comprise a polysulfide or derivative thereof. Alternatively, the rheology modifier comprises a sulfur-containing polyamido amine. In an embodiment, the rheology modifier is prepared by the reaction of a dimer acid and a polysulfide to form a first mixture which is further reacted with a polyfunctional amine to form the rheology modifier.

Herein, the term "dimer acid" is synonymous with the term dibasic acid and refers to an oligomeric fatty acid product that is the result of the self-condensation of two unsaturated fatty acids. In an embodiment, the two unsaturated fatty acids involved in the self-condensation to form the dimer acid are the same, alternatively, the two unsaturated fatty acids involved in the self-condensation to form the dimer acid are different. In an embodiment, each unsaturated fatty acid participating in the self-condensation reaction comprises any number of carbon atoms. The unsaturated fatty acid can comprise a C12-C24 unsaturated fatty acid, alternatively, a C14-C22 unsaturated fatty acid, or alternatively, a C14-C18 unsaturated fatty acid. In an embodiment, the unsaturated fatty acid comprises a C14-18 unsaturated fatty acid. In an embodiment, the polysulfide comprises di(hydroxyethyl)polysulfides or homopolymers thereof. Alternatively, the polysulfide comprises a di(hydroxyethyl)disulfide, a di(hydroxyethyl)trisulfide, and/or a di(hydroxyethyl)tetrasulfide. In an embodiment, the polysulfide can be a compound characterized by general Formula I or Formula Ia.

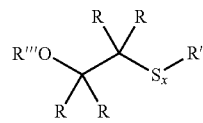

Formula I

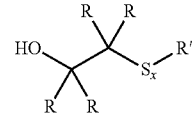

Formula Ia

In an embodiment, each R, R', and R''' can be different. In some embodiments, each R, R', and R''' can be the same. In other embodiments, at least two of the R, R', and R''' groups are the same. In an embodiment, each R, R', and R''' can be independently selected from the group consisting of hydrogen and an organyl group; or alternatively, hydrogen and a hydrocarbyl group. In some embodiments, each non-hydrogen R group can be independently selected from the group consisting of an alkyl group, a substituted alkyl group, a cycloalkyl group, a substituted cycloalkyl group, an aryl group, a substituted aryl group, a heteroaryl group, and a substituted heteroaryl group.

In an embodiment, the non-hydrogen R, R' or R'" group can be independently selected from the group consisting of a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, an octadecyl group, or a nonadecyl group; or alternatively, a methyl group, an ethyl group, a propyl group, a butyl group, a pentyl group, a hexyl group, a heptyl group, an octyl group, a nonyl group, and a decyl group.

In an embodiment, x of the polysulfide moiety can be a number ranging from 2 to 6; alternatively, 3 to 6; or alternatively, 3 to 4. In other embodiments, the polysulfide moiety can be 2; alternatively, 3; alternatively, 4; alternatively, 5; or alternatively, 6. One having ordinary skill in the art recognizes that compositions containing compounds having a polysulfide moiety can typically contain compounds having different values of x. For example, commercially available dithiodiglycol contains the polysulfide having the formula $HOC_2H_4S_2C_2H_4OH$ and some polysulfide having the formula $HOC_2H_4S_3C_2H_4OH$. Consequently, the value x for the polysulfide can be described as having an average value of x. Generally, x can have an average of greater than 2. In some embodiments, x can have an average of greater than 2.03; alternatively, greater than 2.25; alternatively, greater than 2.5; alternatively, greater than 3; alternatively, greater than 3.5; or alternatively, greater than 4. In some other embodiments, x can have an average value ranging from 2.03 to 6; alternatively, from 2.03 to 5; alternatively, from 2.03 to 4.5; alternatively, from 2.03 to 2.15; alternatively, from 2.5 to 3.5; alternatively, 3.5 to 4.5. In other embodiments, the average value of x for the polysulfide can be about 2.03; alternatively, about 2.25; alternatively, about 2.5; alternatively, about 3; alternatively, about 3.5; or alternatively, about 4.

In an embodiment, the polyfunctional amine comprises a molecule containing at least two amine groups having either primary, secondary and/or tertiary functionalities and capable of reacting with the first mixture to form the rheology modifier. Alternatively, the polyfunctional amine comprises 3-ethylaminopiperazine. Methods for producing the rheology modifier are described in more detail in U.S. Pat. No. 7,087,708 which is incorporated by reference herein in its entirety. As will be understood by one of ordinary skill in the art, the rheology modifier prepared as described herein is a reaction product comprising a number of differing compounds. Further the constituents of the reaction product may vary depending on variations in the reaction conditions used to obtain the product (e.g., reaction time, reaction temperature). In an embodiment, the reaction product disclosed herein may be used in wellbore servicing fluids without further purification or separation of the constituent(s) of the reaction product. In an alternative embodiment, the reaction product may be separated into constituent components. In such an embodiment, the constituents of the reaction product may be separated using any suitable technique and the extent to which the individual constituents of the reaction product are purified may vary. In some embodiments, one or more of the individual constituents of the reaction product are characterized as having the ability to modify the rheology of a wellbore servicing fluid as described herein. In an embodiment, the rheology modifier may comprise one or more of the separated constituents of the reaction product.

In an embodiment, the rheology modifier further comprises a diluent. The diluent may be introduced to the rheology modifier in order to give the rheology modifier a physical form suitable for use in an oilfield operation (e.g., flowable viscosity). In an embodiment, the diluent comprises any fluid compatible with the other components of the rheology modifier which when introduced to the material decreases the viscosity of the rheology modifier to some user and/or process desired range. Alternatively, the rheology modifier as prepared comprises a highly viscous material that lacks the flow properties desired for used in an oilfield operation. Diluent may be included in the rheology modifier in an amount sufficient to achieve some user and/or process desired flow properties. In an embodiment, the rheology modifier comprises diluents suitable for the environmental issues experienced offshore in the Gulf of Mexico as well as the North Sea. Nonlimiting examples of classes of diluents that are suitable for use in the present disclosure are the internal olefins of C16-C24 carbon length as produced by Chevron Phillips Chemical Company, as well as, the cellulosic ether derivatives more commonly utilized in the coatings industry as diluents components. In an embodiment, the diluent comprises butyl carbitol. In an embodiment, the diluent is used to dilute the rheology modifier by an amount sufficient to provide a viscosity that meets some user and/or process goal. In an embodiment, the diluent is present in an amount that dilutes the rheology modifier by about 30%; alternatively, by about 20%; or alternatively, by about 10%. In an embodiment, the rheology modifier (based on 100% activity) is present in the FRC in an amount of from about 0.02 weight percent (wt. %) to about 2.2 wt. % based on the total weight of the FRC, alternatively, from about 0.1 wt. % to about 1.4 wt. %, or alternatively, from about 0.2 wt. % to about 1.1 wt. %.

In an embodiment, the FRC comprises a non-aqueous WSF. As used herein, a non-aqueous WSF includes fluids that are comprised entirely or substantially of non-aqueous fluids and/or invert emulsions wherein the continuous phase is a non-aqueous fluid. In an embodiment, the non-aqueous WSF comprises less than about 30%, 25%, 20%, 15%, 10% or 1% water by weight of the WSF. Alternatively, the WSF composition may contain a balance of the non-aqueous fluid after taking other components of the fluid composition into account.

In an embodiment, the WSF comprises an oleaginous fluid. Alternatively, the WSF after taking other components of the fluid composition into account may consist essentially of an oleaginous fluid. Alternatively, the WSF after taking other components of the fluid composition into account may consist of an oleaginous fluid. Oleaginous fluids herein refer to fluids comprising substantially no aqueous component. Examples of oleaginous fluids suitable for use in the WSF include without limitation hydrocarbons, olefins, internal olefin based oils, mineral oil, kerosene, diesel oil, fuel oil, synthetic oil, linear or branched paraffins, esters, acetals, mixtures of crude oil, derivatives thereof, or combinations thereof.

In an embodiment, the WSF is an oil-based drilling mud (OBM) of the type used in drilling operations. The OBM may comprise an oleaginous fluid of the type disclosed herein. In some embodiments, the OBM is an invert emulsion having a non-oleaginous fluid as the dispersed phase and an oleaginous fluid as the continuous phase. In some embodiments, the WSF may comprise additional additives as deemed appropriate for improving the properties of the fluid. Such additives may vary depending on the intended use of the fluid in the wellbore. Examples of such additives include, but are not limited to, weighting agents, glass fibers, carbon fibers, suspending agents, conditioning agents, dispersants, water softeners, oxidation and corrosion inhibitors, bacteriacides, thinners, and combinations thereof. These additives may be introduced singularly or in combination using any suitable methodology and in amounts effective to produce the desired improvements in fluid properties.

In an embodiment, the FRCs disclosed herein (e.g., OBM+ rheology modifier) display a flat rheology. Herein, "flat rheology" refers to the ability of the composition to maintain relatively stable rheological characteristics over a range of temperatures and pressures. In an embodiment, "relatively stable" refers to variations in the disclosed parameter (e.g., yield point) during use that are within ±20% of the original value, alternatively, ±15%, 10%, 5%, or 1% of the original value. In an embodiment, the rheological characteristics of the FRC may be considered "relatively stable" if a plot of the observed rheological parameter (e.g., yield point) as a function of temperature and/or pressure displays a plateau. The rheological characteristics of the FRC may be considered "relatively stable" if the FRC maintains some user and/or process desired rheological characteristics (e.g., yield point) over a broad range temperature and pressure such that the FRC functions for its intended purpose under a range of conditions.

In an embodiment, an FRC of the type disclosed herein displays a variation in yield point of less than about 20%; alternatively, less than about 15%; or alternatively, less than about 10% over a temperature range of from about 100° F. to about 430° F., alternatively, from about 50° F. to about 350° F., or alternatively, from about 35° F. to about 400° F. The yield point refers to the resistance of the fluid to initial flow or represents the stress required to start fluid movement. Practically, the YP is related to the attractive force among colloidal particles in drilling mud and may be determined by a dynamic rheometric measurement of the moving fluids. The rheometer most commonly utilized in the drilling industry (and most easily related to) is the Fann 35 Rheometer. Thus, one subtracts the 300 rpm reading from the 600 rpm reading at a particular controlled temperature to obtain the plastic viscosity (PV value). Subsequently, the PV is subtracted from the 300 rpm value to obtain the yield point (YP). Not all fluids are treated with rheology modifiers, thus, it is common for the yield points as well as pressures in the well bore to drop up to 20% or so with increasing temperature of the greater depths of the wellbore.

In an embodiment, an FRC of the type disclosed herein displays a variation in gel strength of less than about 20%; alternatively, less than about 15%; or alternatively, less than about 10% over a temperature range of from about 100° F. to about 400° F.; alternatively, from about 50° F. to about 350° F.; or alternatively, from about 35° F. to about 400° F. The gel strength may be determined by Fann 35 Rheometric analysis. Gel Strength is a static measurement in that the measurement is determined after the fluids have been static for a defined time frame. During this time, a dynamic equilibrium based on diffusional interfacial interactions is reached which also determines the stability of the fluid or the ability to suspend cuttings.

In an embodiment, an FRC of the type disclosed herein displays a variation in gel strength and/or yield point of less than about 20%; alternatively, less than about 15%; or alternatively, less than about 10% when subjected to cyclic temperature changes. Particularly, an FRC of the type disclosed herein may be subjected to an initial temperature $T_i$, for example when prepared at the surface of an offshore platform. The FRC when placed into the wellbore may travel from the platform through a conduit to the ocean floor. Disposed within the conduit the FRC may experience a range of temperatures associated with the surrounding ocean and collectively denoted $T_c$ where $T_c$ is less than $T_i$. Upon entering the conduit and the subterranean formation via the wellbore, the FRC may experience a range of temperatures associated with the formation and collectively denoted $T_f$ where $T_f$ is greater than $T_c$ or greater than $T_i$. Thus, the FRC may be exposed to cycles of alternating elevated and decreased temperatures and maintain a rheology consistent with the intended function of the FRC.

In an embodiment, an FRC of the type disclosed herein displays an initial yield point and gel strength at ambient temperature that is greater than an otherwise similar composition lacking a rheology modifier of the type disclosed herein. Herein, "ambient temperature" refers to the temperature in the range of from about 40° F. to about 100° F. As a result, the FRC may have improved suspension ability when compared to an otherwise similar composition lacking a rheology modifier of the type disclosed herein. In an embodiment, a FRC of the type disclosed herein may display a yield point of greater than about 6 lbs/100 ft$^2$; alternatively, greater than about 8 lbs/100 ft$^2$; or alternatively, greater than about 10 lbs/100 ft$^2$. In an embodiment, a FRC of the type disclosed herein has a 10 minute gel strength of greater than about 8 lbs/100 ft$^2$; alternatively, greater than about 10 lbs/100 ft$^2$; or alternatively, greater than about 12 lbs/100 ft$^2$.

In an embodiment, an FRC of the type disclosed herein may advantageously function as a corrosion inhibitor. In such an embodiment, the FRC disposed within a piece of oilfield servicing equipment or contacted with a piece of oilfield servicing equipment (e.g., conduit) may function to prevent corrosion of the oilfield servicing equipment when the equipment is exposed to "free water." Herein, free water refers to water present in the form of "formation water" or water present due to degradation of the surfactant package of the oil based drilling fluid over time and temperature.

The FRC can be placed into a wellbore and used to service the wellbore in accordance with suitable procedures. For example, when the intended use of the FRC is as a drilling fluid or drilling mud (e.g., OBM), the fluid can be circulated down through a hollow drill stem and out through a drill bit attached thereto while rotating the drill stem to thereby drill the wellbore. The drilling fluid can be flowed back to the surface in a circulatory repetitive path such as to lubricate the drill bit, deposit a filter cake on the walls of the wellbore and to continuously carry drill cuttings to the surface. In an embodiment, the FRC is prepared at the wellsite. Alternatively, the FRC is prepared offsite and transported to the use site before being placed downhole. FRCs of the type disclosed herein advantageously provide for rheological characteristics that are stable over the range of temperatures and pressures that the fluid may experience during an oil field operation. In an embodiment, FRCs of the type disclosed herein are utilized in maritime oilfield operations. In such embodiments, the FRC may be placed into a wellbore from the surface and transported via the appropriate conduit to a subsea well disposed in a formation. FRCs transported from the platform to the subsea well formation may be subjected to a broad range of temperatures and pressures. FRCs of the type disclosed herein may advantageously provide rheological characteristics that fluctuate within the previously disclosed ranges over the course of temperatures and pressures experienced.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

For the examples to follow the rheology modifier was prepared by combining in a reaction vessel 1 mole of DIHEDS and 2 moles of UNIDYME 14 to which 0.1 wt. % methanesulfonic acid was added as a catalyst. DIHEDS is di-(2-hydroxyethyl)disulfide commercially available from Chevron Phillips Chemical Co. while UNIDYME 14 is a dimer acid commercially available from Arizona Chemical, Dimer. The vessel was heated to between 125° C. and 130° C. with constant mixing under low vacuum (10 mm Hg) in order to remove water from the reaction mixture. The first stage of the reaction was considered complete when an acid number of 83.58 mg KOH/gM was reached. The acid number was determined in accordance with ASTM D 465. N-aminoethyl piperazine was then added to the products of the reaction mixture in the amount of 2.1 mols. This mixture was then heated to between 130° C. and 135° C. for less than 1 hour under atmospheric pressure, the pressure was then lowered to 10 mm Hg and the reaction continued, for usually another 2 hours, until the amine number was approximately 80 mg KOH/gM. No more water evolution was observed when the amine number approached 80 mg KOH/gM. The final reaction product was cooled to approximately 80° C. and transferred to containers. A one gallon blend of the final reaction product was mixed with butyl carbitol at a 70:30 ratio for 3 hours at 167° F. and used as a rheology modifier of the type disclosed herein (designated RMX) in the following examples.

Example 1

The rheology of a FRC of the type disclosed herein was investigated. Oil-based muds were prepared by mixing oleaginous fluid (2120 g), lime (75 g), VG-69 Clay (87.5 g), INVERMUL primary emulsifier (75 g), EZMUL emulsifier (75 g), and 30% CaCl$_2$ brine (815 g). VG-69 is an organophillic clay commercially available from Mi SWACO. EZMUL emulsifier is a polyaminated fatty acid and INVERMUL is a blend of oxidized tall oil and polyaminated fatty acid, both of which are commercially available from Baroid Chemicals. The OBMs were prepared to a density of 14 pounds per gallon (ppg) and a 75:25 oil:water ratio (OWR).

Samples contained the OBM (208 g), Barite (212 g), API clay (8 g) and the indicated amount of either RMX (Sample A) or THIXATROL rheological additive (Sample B). THIXATROL rheological additive is a modified derivative of castor oil commercially available from Elementis Specialties. The samples were mixed for approximately 30 minutes using a multi-mixer and subsequently hot-rolled at 300° F. for 16 hours. Control samples did not contain any rheology modifying materials. Rheology tests were performed on the gel using a Fann 35 viscometer. The results are given in Table 1 for samples which had a diesel (Diesel #2) as the oleaginous fluid while Table 2 gives the result when using ESCAID 110 as the oleaginous fluid. ESCAID 110 hydrocarbon fluid is a petroleum distillate commercially available from EXXON-MOBIL Corp.

TABLE 1

| | Control | Sample A | Sample B |
|---|---|---|---|
| Fan 35 Rheology @ 85° F. | | | |
| 600 rpm | 101 | 137 | 144 |
| 300 rpm | 66 | 92 | 96 |
| PV | 35 | 45 | 48 |
| YP | 31 | 47 | 48 |
| 200 rpm | 53 | 76 | 79 |
| 100 rpm | 38 | 56 | 55 |
| 6 rpm | 7 | 31 | 30 |
| 3 rpm | 6 | 30 | 26 |
| Gels 10 sec, 10 min | 18/25 | 37/48 | 38/56 |
| Fan 35 Rheology @ 120° F. | | | |
| 600 rpm | 78 | 128 | 140 |
| 300 rpm | 51 | 87 | 106 |
| PV | 27 | 41 | 34 |
| YP | 24 | 46 | 72 |
| 200 rpm | 41 | 70 | 87 |
| 100 rpm | 30 | 52 | 64 |
| 6 rpm | 14 | 29 | 37 |
| 3 rpm | 13 | 27 | 34 |
| Gels 10 sec, 10 min | 15/20 | 34/44 | 44/58 |
| Fan 35 Rheology @ 150° F. | | | |
| 600 rpm | 60 | 113 | 144 |
| 300 rpm | 42 | 80 | 110 |
| PV | 18 | 33 | 34 |
| YP | 24 | 47 | 76 |
| 200 rpm | 34 | 67 | 90 |
| 100 rpm | 24 | 52 | 69 |
| 6 rpm | 11 | 30 | 44 |
| 3 rpm | 10 | 28 | 42 |
| Gels 10 sec, 10 min | 12/17 | 34/41 | 47/56 |
| ES @ 150° F. = | 811 | 1546 | 1486 |
| HTHP @ 300° F. | 14.4 ml | 17.2 ml | |

TABLE 2

| | Control | Sample A | Sample B |
|---|---|---|---|
| Fan 35 Rheology @ 85° F. | | | |
| 600 rpm | 59 | 78 | 70 |
| 300 rpm | 36 | 49 | 43 |
| PV | 23 | 29 | 27 |
| YP | 13 | 20 | 16 |
| 200 rpm | 27 | 38 | 32 |
| 100 rpm | 17 | 26 | 20 |
| 6 rpm | 6 | 11 | 7 |
| 3 rpm | 5 | 10 | 6 |
| Gels 10 sec, 10 min | 7/9 | 16/28 | 12/24 |
| Fan 35 Rheology @ 120° F. | | | |
| 600 rpm | 45 | 66 | 61 |
| 300 rpm | 27 | 43 | 39 |
| PV | 18 | 23 | 22 |
| YP | 9 | 20 | 17 |
| 200 rpm | 19 | 34 | 29 |
| 100 rpm | 12 | 24 | 20 |
| 6 rpm | 4 | 11 | 8 |
| 3 rpm | 3 | 10 | 7 |
| Gels 10 sec, 10 min | 4/8 | 16/24 | 12/21 |
| Fan 35 Rheology @ 150° F. | | | |
| 600 rpm | 37 | 58 | 54 |
| 300 rpm | 21 | 40 | 35 |
| PV | 16 | 18 | 19 |
| YP | 5 | 22 | 16 |
| 200 rpm | 15 | 33 | 27 |
| 100 rpm | 9 | 23 | 18 |
| 6 rpm | 3 | 12 | 8.5 |
| 3 rpm | 2.5 | 11 | 7.5 |
| Gels 10 sec, 10 min | 4/6 | 15/21 | 12/18 |
| ES @ 150° F. = | 569 | 1002 | 712 |
| HTHP @ 300° F. | 21.0 ml | 16.2 ml | 18.2 ml |

HTHP stands for the high-temperature high-pressure (HTHP) fluid loss. The HTHP fluid loss was determined in accordance with the *Specification for Drilling Fluids Materials*, ANSI/API Specification 13A, Eighteenth Edition, February 2010. ES stands for emulsion stability which was determined with an emulsion stability meter which measures the voltage across a small gap filled with oil based mud with a aqueous discontinuous phase (at a known temperature). The higher the voltage recorded the greater the stability of the emulsion.

Figure 2:
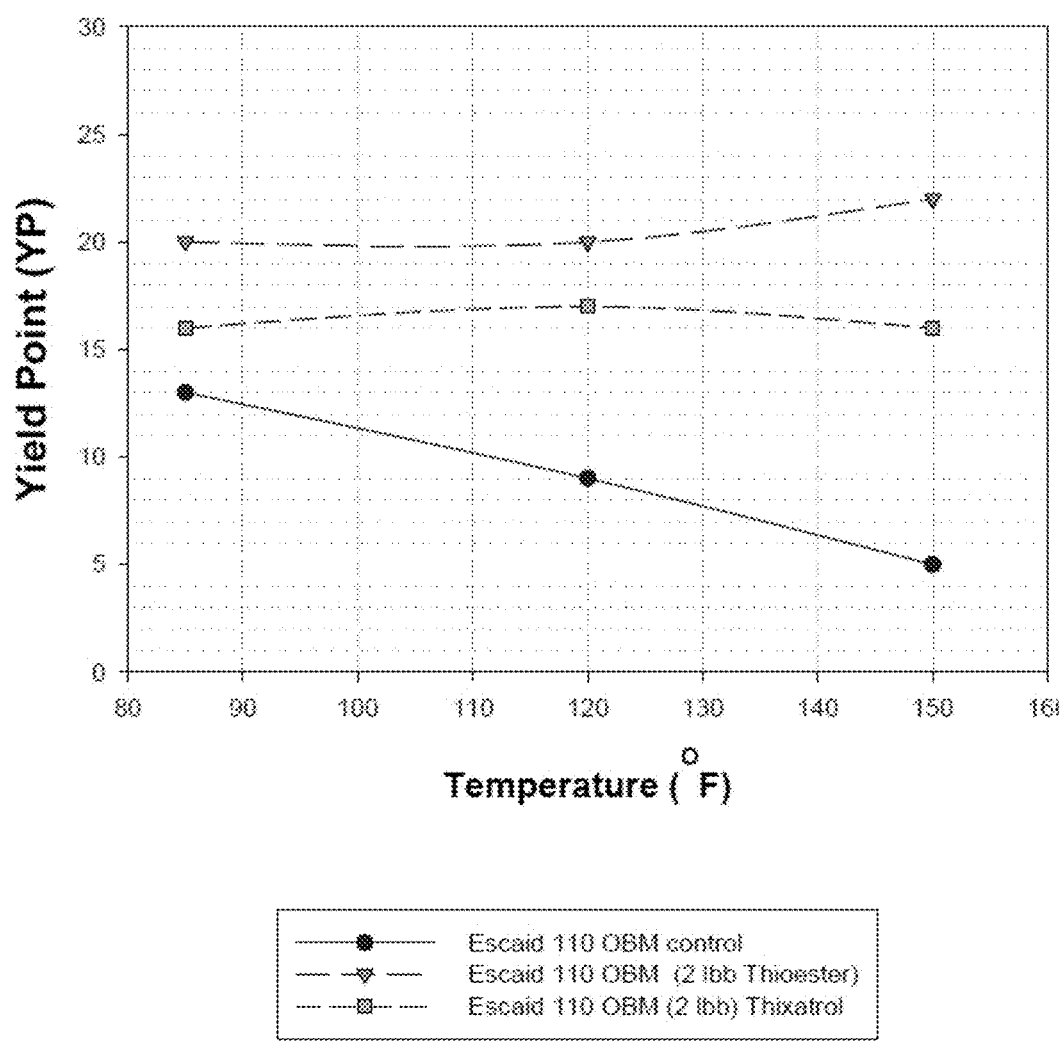

Referring to Tables 1 and 2, it is discernible during Fann 35 rheology studies that for the control samples, properties such as YP (yield point) and gels (gel strengths at 10 seconds, 10 minutes, and 30 minutes) decrease rather noticeably as the temperature increased from 85° F. to 150° F. (typical testing parameters). The yield points for the samples from Tables 1 and 2 are plotted in FIGS. 1 and 2 respectively. Upon the addition of approximately 2 lbb (pounds per barrel) of RMX it was observed that the YP and gel strength increased in value over that of the control along the temperature testing range (85° F., 120° F., and 150° F.). As temperature was increased during the Fann experiment, the YP gel strength values for the samples containing a RMX did not decrease to the extent observed for the control samples. The drop in YP and gel strength with increasing temperature is more noticeable for the Control samples in Table 2 which contain the ESCAID 110 hydrocarbon fluid based OBM. Without wishing to be limited by theory, the OBM having ESCAID 110 hydrocarbon fluid is more paraffinic in nature than the diesel fuel (higher naphthenic character) and has less affinity for dissolution or solvent interaction with the rheology modifiers. However, in both OBMs the RMXs of this disclosure are as effective as THIXATROL in changing rheology such that the overall fluid properties are much improved.

Example 2

The effect of varying the concentration of the RMX in the FRCs of this disclosure was investigated. Four samples were prepared containing the ESCAID-OBM described in Example 1 and either RMX (Control), 1.8 lb of the RMX (Sample C), 1.5 lb of the RMX (Sample D), 1.3 lb of the RMX (Sample E) or 2 lb of RMX (Sample F).

TABLE 3

|  | Control | Sample C | Sample D | Sample E | Sample F |
|---|---|---|---|---|---|
| Fan 35 Rheology @ 85° F. | | | | | |
| 600 rpm | 59 | 82 | 79 | 76 | 70 |
| 300 rpm | 36 | 50 | 48 | 47 | 43 |
| PV | 23 | 32 | 31 | 29 | 27 |
| YP | 13 | 18 | 17 | 18 | 16 |
| 200 rpm | 27 | 38 | 37 | 36 | 32 |
| 100 rpm | 17 | 26 | 25 | 24 | 20 |
| 6 rpm | 6 | 11 | 10.5 | 10 | 7 |
| 3 rpm | 5 | 10 | 10 | 9 | 6 |
| Gels 10 sec, 10 min | 7/9 | 16/27 | 15/25 | 14/23 | 12/24 |
| Fan 35 Rheology @ 120° F. | | | | | |
| 600 rpm | 45 | 70 | 66 | 63 | 61 |
| 300 rpm | 27 | 42 | 40 | 39 | 39 |
| PV | 18 | 28 | 26 | 24 | 22 |
| YP | 9 | 14 | 14 | 15 | 17 |
| 200 rpm | 19 | 33 | 31 | 31 | 29 |
| 100 rpm | 12 | 24 | 22 | 21 | 20 |
| 6 rpm | 4 | 11 | 10 | 9 | 8 |
| 3 rpm | 3 | 10 | 9 | 8 | 7 |

TABLE 3-continued

|  | Control | Sample C | Sample D | Sample E | Sample F |
|---|---|---|---|---|---|
| Gels 10 sec, 10 min | 4/8 | 16/23 | 13/21 | 12/20 | 12/21 |
| Fan 35 Rheology @ 150° F. | | | | | |
| 600 rpm | 37 | 62 | 54 | 52 | 54 |
| 300 rpm | 21 | 39 | 34 | 33 | 35 |
| PV | 16 | 23 | 20 | 19 | 19 |
| YP | 5 | 16 | 14 | 14 | 16 |
| 200 rpm | 15 | 33 | 29 | 27 | 27 |
| 100 rpm | 9 | 24 | 21 | 19 | 18 |
| 6 rpm | 3 | 12 | 9.5 | 8.5 | 8.5 |
| 3 rpm | 2.5 | 11 | 9 | 8 | 7.5 |
| Gels 10 sec, 10 min, 30 min | 4/6/5 | 14/22/23 | 12/17/20 | 11/16/18 | 12/18/20 |
| ES @ 150° F. = | 569 | 955 | 960 | 815 | 712 |
| HTHP@ 300° F. | 21.0 ml | 22.8 ml | 19.6 ml | 16.0 ml | 18.2 ml |

Figure 3:
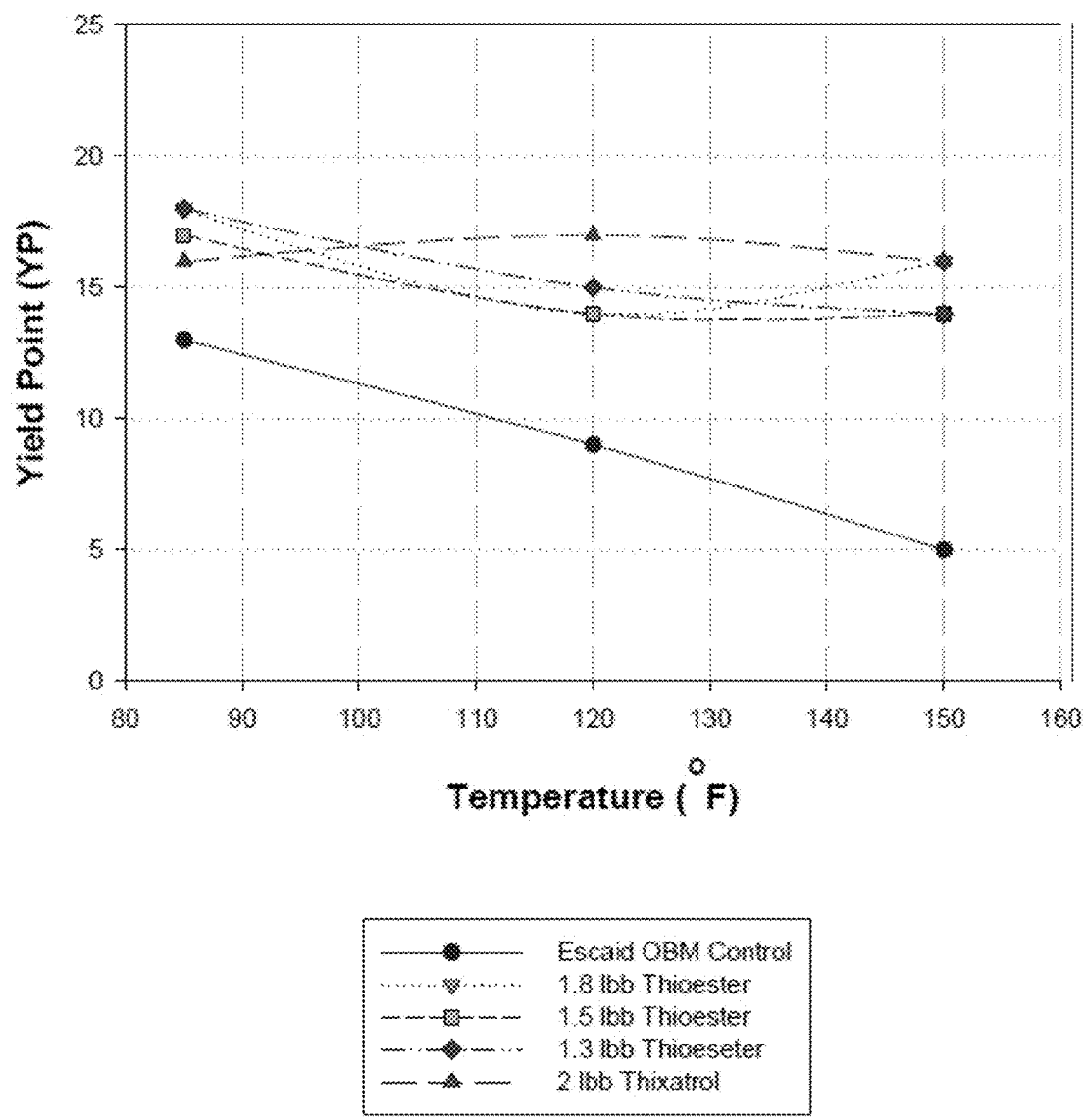
FIG. 3 is a plot of yield point as a function of temperature for the samples from Example 2.

The results demonstrate the values of YP and gel strength remained relatively constant throughout the concentrations of RMX investigated and were similar to values observed when using THIXATROL rheological additive at 2 lbb. The yield points for the samples from III are plotted in FIG. 3. Further the results of the 30 minute gel strengths performed at 150° F. samples containing a RMX yielded surprisingly beneficial and encouraging results. Without wishing to be limited by theory, the significance of the 30 minute gel values remaining stable or unchanging suggests that an FRC (e.g., OBM) made in accordance with the present disclosure may have sufficient suspension capability that it may stand for some period of time (e.g., 30 minutes) without loss of the suspended particulate material.

Example 3

Figure 4:
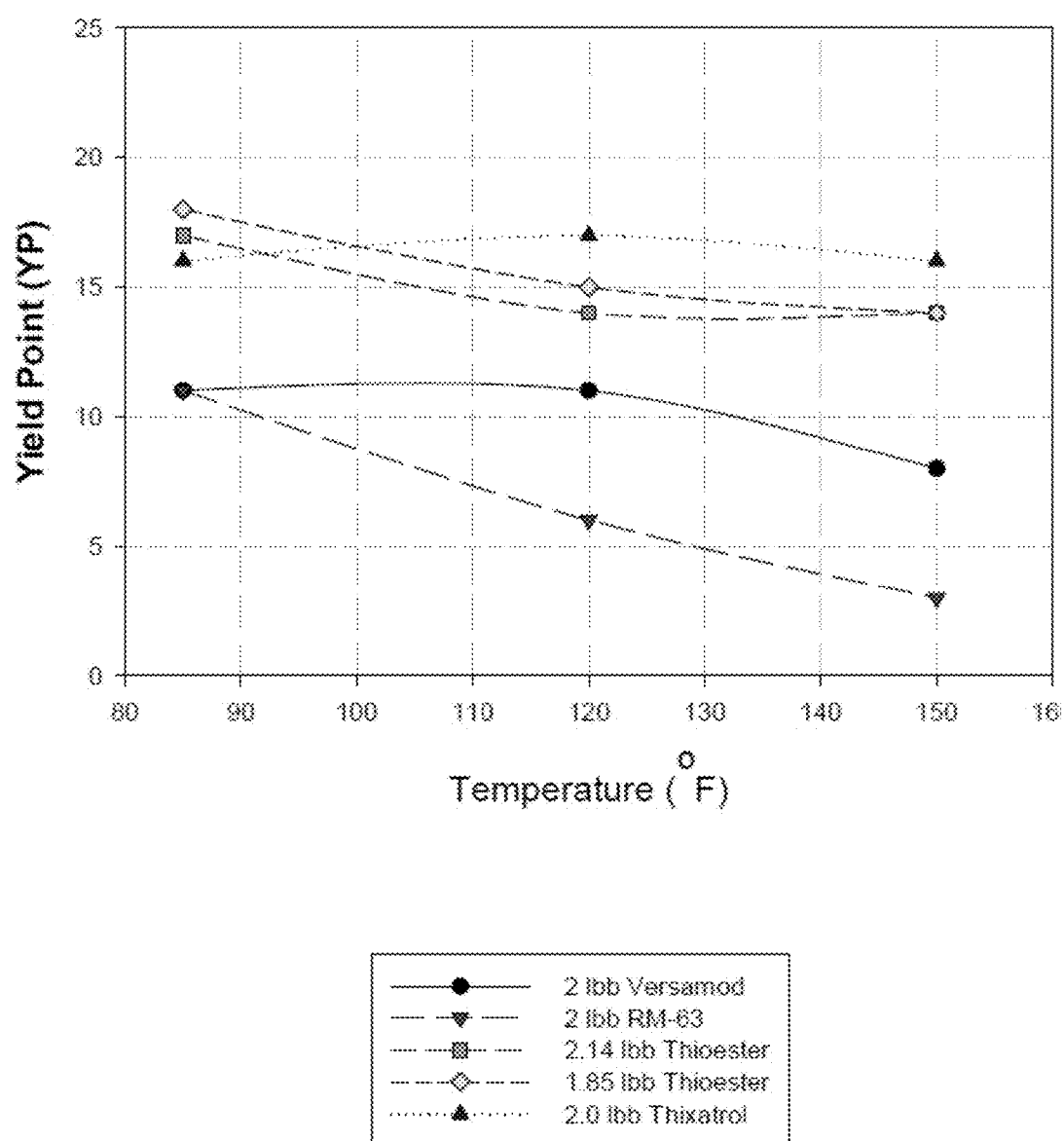
FIG. 4 is a plot of yield point as a function of temperature for the samples from Example 3.

The rheological characteristics of an FRC of the type disclosed herein were compared to wellbore servicing fluids having conventional rheological additives. Samples were prepared using the ESCAID 110 based OBM described in Example 1 and the following amounts of rheological additives: VERSAMOD (2 lbb) in Sample G; RM-63 (2 lbb) in Sample H; RMX (2.14 lbb) Sample I; RMX (1.85 lbb) Sample J; and THIXATROL (2 lbb) Sample K. RM-63 viscosifier is a rheological additive commercially available from Halliburton Energy Services, and VERSAMOD organic gelling agent is a liquid rheology modifier commercially available from Mi SWACO. The results of the rheological testing are presented in Table 4 and the yield points for the samples are plotted in FIG. 4.

TABLE 4

|  | Sample G | Sample H | Sample I | Sample J | Sample K |
|---|---|---|---|---|---|
| Fan 35 Rheology @ 85° F. | | | | | |
| 600 rpm | 71 | 63 | 79 | 76 | 70 |
| 300 rpm | 41 | 37 | 48 | 47 | 43 |
| PV | 30 | 26 | 31 | 29 | 27 |
| YP | 11 | 11 | 17 | 18 | 16 |
| 200 rpm | 29 | 26 | 37 | 36 | 32 |
| 100 rpm | 17 | 15 | 25 | 24 | 20 |
| 6 rpm | 5 | 4 | 10.5 | 10 | 7 |
| 3 rpm | 4 | 3 | 10 | 9 | 6 |

TABLE 4-continued

|  | Sample G | Sample H | Sample I | Sample J | Sample K |
|---|---|---|---|---|---|
| Gels 10 sec, 10 min | 8/25 | 6/23 | 15/25 | 14/23 | 12/24 |
| Fan 35 Rheology @ 120° F. | | | | | |
| 600 rpm | 57 | 54 | 66 | 63 | 61 |
| 300 rpm | 34 | 30 | 40 | 39 | 39 |
| PV | 23 | 24 | 26 | 24 | 22 |
| YP | 11 | 6 | 14 | 15 | 17 |
| 200 rpm | 22 | 21 | 31 | 31 | 29 |
| 100 rpm | 13 | 12 | 22 | 21 | 20 |
| 6 rpm | 4 | 3 | 10 | 9 | 8 |
| 3 rpm | 3 | 2 | 9 | 8 | 7 |
| Gels 10 sec, 10 min | 7/19 | 4/20 | 13/21 | 12/20 | 12/21 |
| Fan 35 Rheology @ 150° F. | | | | | |
| 600 rpm | 46 | 43 | 54 | 52 | 54 |
| 300 rpm | 27 | 23 | 34 | 33 | 35 |
| PV | 19 | 20 | 20 | 19 | 19 |
| YP | 8 | 3 | 14 | 14 | 16 |
| 200 rpm | 17 | 16 | 29 | 27 | 27 |
| 100 rpm | 10 | 9 | 21 | 19 | 18 |
| 6 rpm | 3 | 2 | 9.5 | 8.5 | 8.5 |
| 3 rpm | 2 | 1 | 9 | 8 | 7.5 |
| Gels 10 sec, 10 min, 30 min | 6/16/17 | 3/16/17 | 12/17/20 | 11/16/18 | 12/18/20 |
| ES @ 150° F. = | 520 | 500 | 960 | 815 | 712 |
| HTHP @ 300° F. | | | 19.6 ml | 16.0 ml | 18.2 ml |

A comparison of the samples containing RMX (Samples I and J) was made to commercially available products based on product usage rates typical for field use. The commercial species were tested at 2 lbb concentration against concentrations of 2.14 lbb and 1.85 lbb for the RMX. The object was to bracket the 2 lbb range to see if there was much deviation in performance of the RMX given the slightly lower or higher additive concentration. The results demonstrate the RMX outperformed both the VERSAMOD and RM-63 in that both YP and gel strength values for the RMX remained fairly constant, whereas, those same values fell precipitously as the samples containing the VERSAMOD and RM-63 products increased in temperature.

Additional Embodiments

The following enumerated embodiments are provided as non-limiting examples:

1. A non-aqueous wellbore servicing fluid comprising a rheology modifier wherein the rheology modifier comprises a reaction product of a polysulfide, a dimer acid and a polyfunctional amine.

2. The fluid of embodiment 1 wherein the rheology modifier is present in the wellbore servicing fluid in an amount of from about 0.02 wt. % to about 2.2 wt. % based on the total weight of the wellbore servicing fluid.

3. The fluid of any preceding embodiment wherein the polysulfide comprises di(hydroxyethyl)polysulfides, di(hydroxyethyl)disulfide, di(hydroxyethyl)trisulfide, di(hydroxyethyl)tetrasulfide or homopolymers thereof.

4. The fluid of any preceding embodiment wherein the polysulfide is characterized by general Formula I or Ia:

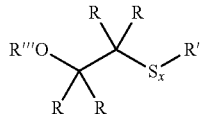

Formula I

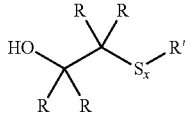

Formula Ia where each R, R' and R'" can be independently selected from the group consisting of hydrogen and an organyl group and x has an average value greater than 2.

5. The fluid of any preceding embodiment wherein the dimer acid comprises a C12-C24 unsaturated fatty acid.

6. The fluid of any preceding embodiment wherein the polyfunctional amine comprise a molecule containing at least two amine groups.

7. The fluid of any preceding embodiment wherein the non-aqueous wellbore servicing fluid comprises an oil-based mud.

8. The fluid of any preceding embodiment having a variation in yield point of less than about 20% over a temperature range of from about 100° F. to about 430° F.

9. The fluid of any preceding embodiment having a variation in gel strength of less than about 20% over a temperature range of from about 100° F. to about 430° F.

10. The fluid of any preceding embodiment wherein the rheology modifier functions as a corrosion inhibitor.

11. A method of conducting an oilfield operation comprising: placing an oil-based mud comprising a rheology modifier into a wellbore wherein the rheology modifier comprises a reaction product of a polysulfide, a dimer acid and a polyfunctional amine.

12. The method of embodiment 11 wherein the oilfield operation is a maritime oilfield operation.

13. The method of embodiment 11 or 12 wherein the rheology modifier is present in the oil-based mud in an amount of from about 0.02 wt. % to about 2.2 wt. % based on the total weight of the wellbore servicing fluid.

14. The method of embodiment 11, 12, or 13 wherein the polysulfide comprises di(hydroxyethyl)polysulfides, di(hydroxyethyl)disulfide, di(hydroxyethyl)trisulfide, di(hydroxyethyl)tetrasulfide or homopolymers thereof.

15. The method of embodiment 11, 12, 13, or 14 wherein the oil-based mud has a variation in yield point of less than about 20% over a temperature range of from about 100° F. to about 430° F.

16. The method of any of embodiments 11-15 wherein the oil-based mud displays a flat rheology.

17. The method of any of embodiments 11-16 wherein the oil-based mud is subjected to cyclic temperature stresses.

18. The method of any of embodiments 11-17 wherein the oil-based mud has a variation in yield point of less than about 20%.

19. The method of any of embodiments 11-18 wherein the oil-based mud has a variation in gel strength of less than about 20% over a temperature range of from about 100° F. to about 430° F.

20. The method of any of embodiments 11-19 wherein the dimer acid comprises a C12-C24 unsaturated fatty acid.

Without further elaboration, it is believed that one skilled in the art can, using the description herein, utilize the present invention to its fullest extent. While preferred inventive aspects have been shown and described, modifications thereof can be made by one skilled in the art without departing from the spirit and teachings of the invention. The embodiments and examples described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent that they provide exemplary, procedural or other details supplementary to those set forth herein.

What is claimed is:

1. A method of servicing a wellbore within a subterranean formation comprising:
   placing in the wellbore a composition comprising an oleaginous fluid and a rheology modifier,
   wherein the oleaginous fluid is selected from the group consisting of hydrocarbons, olefins, internal olefin based oils, mineral oil, kerosene, diesel oil, fuel oil, synthetic oil, linear or branched paraffins, esters, acetals, mixtures of crude oil, derivatives thereof, and combinations thereof,
   wherein the rheology modifier comprises a reaction product of a polysulfide, a dimer acid and a polyfunctional amine,
   wherein the rheology modifier is present in the composition in an amount of from about 0.02 wt. % to about 2.2 wt. % based on the total weight of the composition, and
   wherein the composition has a flat rheology.

2. The method of claim 1 wherein the polysulfide comprises di(hydroxyethyl)polysulfides, di(hydroxyethyl)disulfide, di(hydroxyethyl)trisulfide, di(hydroxyethyl)tetrasulfide or homopolymers thereof.

3. The method of claim 1 wherein the polysulfide is characterized by general Formula I:

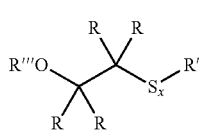

Formula I where each R, R' and R''' can be independently selected from the group consisting of hydrogen and an organyl group and x has an average value greater than 2.

4. The method of claim 1 wherein the dimer acid comprises a C12-C24 unsaturated fatty acid.

5. The method of claim 1 wherein the polyfunctional amine comprise a molecule containing at least two amine groups.

6. The method of claim 1 wherein the rheology modifier further comprises a diluent selected from the group consisting of $C_{16}$-$C_{24}$ internal olefins, cellulosic ether derivatives, and butyl carbitol.

7. The method of claim 1 wherein the composition has a variation in yield point of less than about 20% over a temperature range of from about 100° F. to about 430° F.

8. The method of claim 1 wherein the composition has a variation in yield point of less than about 10% over a temperature range of from about 100° F. to about 430° F.

9. The method of claim 1 wherein the composition has a variation in yield point of less than about 5% over a temperature range of from about 100° F. to about 430° F.

10. The method of claim 1 wherein the composition has a variation in yield point of less than about 1% over a temperature range of from about 100° F. to about 430° F.

11. The method of claim 1 wherein the composition has a variation in gel strength of less than about 20% over a temperature range of from about 100° F. to about 430° F.

12. The method of claim 1 wherein the composition has a variation in gel strength of less than about 10% over a temperature range of from about 100° F. to about 430° F.

13. The method of claim 1 wherein the composition has a variation in gel strength of less than about 5% over a temperature range of from about 100° F. to about 430° F.

14. The method of claim 1 wherein the composition has a variation in gel strength of less than about 1% over a temperature range of from about 100° F. to about 430° F.

15. The method of claim 1 wherein the composition is pumped through one or more pieces of wellbore servicing equipment during the servicing method and wherein rheology modifier functions as a corrosion inhibitor for the wellbore servicing equipment in the presence of free water.

16. The method of claim 1 wherein the composition is formulated as a drilling fluid.

17. The method of claim 16 wherein the drilling fluid comprises one or more additives selected from the group consisting of weighting agents, glass fibers, carbon fibers, suspending agents, conditioning agents, dispersants, water softeners, oxidation inhibitors, corrosion inhibitors, bacteriacides, thinners, and combinations thereof.

18. The method of claim 16 wherein the drilling fluid is an invert emulsion drilling fluid.

19. The method of claim 16 wherein the method of servicing the wellbore is drilling an offshore well.

20. The method of claim 19 wherein the drilling fluid is subjected to cyclic temperature stresses.

21. The method of claim 1 having a yield point of greater than about 6 lbs/100 ft$^2$ and a 10 minute gel strength of greater than about 8 lbs/100 ft$^2$.

* * * * *